United States Patent [19]
Yamada et al.

[11] Patent Number: 4,937,719
[45] Date of Patent: Jun. 26, 1990

[54] RESONANCE DAMPING APPARATUS FOR LC FILTER OF POWER CONVERTER

[75] Inventors: Junichiro Yamada, Mitaka; Munetomo Nishimura, Fuchu, both of Japan

[73] Assignee: Kabushiki Kaisha Toshiba, Kawasaki, Japan

[21] Appl. No.: 399,919

[22] Filed: Aug. 29, 1989

[30] Foreign Application Priority Data

Aug. 29, 1988 [JP] Japan ................... 63-214106

[51] Int. Cl.$^5$ .............................. H02J 1/02
[52] U.S. Cl. ...................... 363/39; 363/47; 333/181
[58] Field of Search ............ 363/15, 16, 39, 47, 363/48; 361/113; 333/12, 181

[56] References Cited

U.S. PATENT DOCUMENTS 4,027,225  5/1977  Elvin ......................... 363/39
4,462,071  7/1984  Blok .......................... 363/47
4,768,002  8/1988  Cronin ....................... 363/47

FOREIGN PATENT DOCUMENTS 174501  7/1988  Japan .

Primary Examiner—Patrick R. Salce
Assistant Examiner—Jeffrey Sterrett
Attorney, Agent, or Firm—Oblon, Spivak, McClelland, Maier & Neustadt

[57] ABSTRACT

The present invention discloses an apparatus for damping resonance of an LC type low-pass filter provided on the DC input side of a power converter having a DC input terminal. The apparatus comprises an electric circuit connected in parallel to a reactor constituting the LC type low-pass filter. The electric circuit has an impedance which takes a substantially minimum value at a frequency equal to the resonance frequency of the LC type low-pass filter.

16 Claims, 4 Drawing Sheets

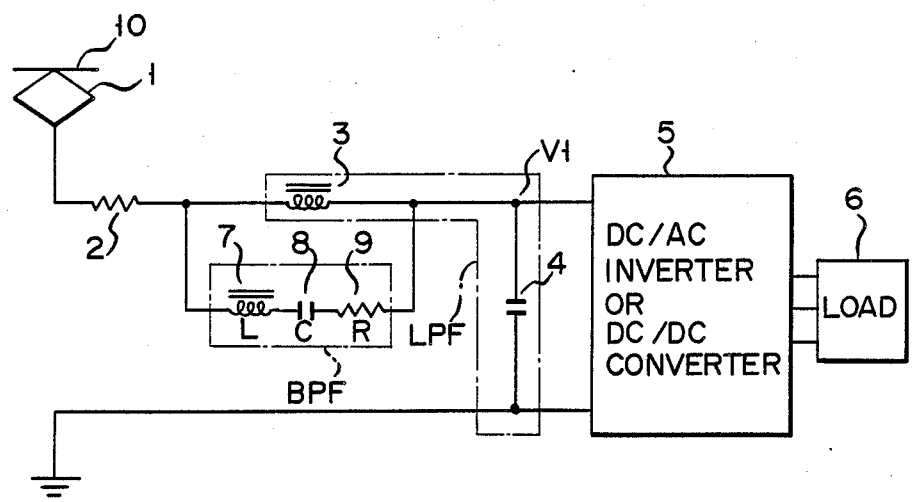
F I G. 1
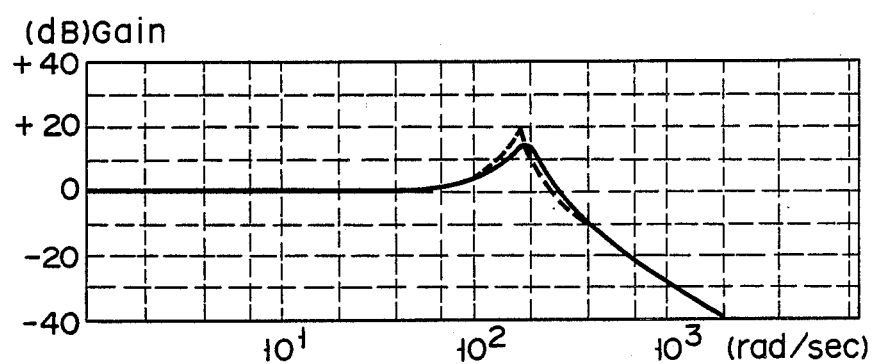
F I G. 2

RESONANCE DAMPING APPARATUS FOR LC FILTER OF POWER CONVERTER

BACKGROUND OF THE INVENTION

1. Field of the Invention

The present invention relates to a technique of damping a peak level of a transfer function of a low-pass filter provided on the DC input side of a power converter, and, in particular, to a resonance damping apparatus for efficiently damping a resonance Q of an LC filter inserted between the DC input side of a DC/AC inverter (or DC/DC converter) for electric railcars and a power line.

2. Description of the Related Art

An electric railcar employs a power conversion apparatus, for example, an inverter apparatus, as a power source for supplying power to loads such as electric motors for driving the railcar, various control devices, air conditioners and illumination devices. The power conversion apparatus converts a high line voltage supplied through a pantagraph to a low voltage suitable for each load.

The inverter apparatus of this type comprises an LC type DC filter having a low-pass characteristic in order to eliminate a high-frequency noise component contained in a line voltage supplied through a pantograph. The filter has a positive gain characteristic having a peak as high as about +20dB in a range of about 50 to 220 rad/sec (8-35 Hz).

The above-described power conversion apparatus having the inverter apparatus is well known, for example, as disclosed in Published Unexamined Japanese Patent Application (PUJPA) No. 63-174501.

When the load and/or DC input of the inverter apparatus abruptly changes, for example, when the load of the inverter or line voltage abruptly changes due to the starting of air-conditioners in the railcar, the ratio of voltages shared by the L (reactor) and C (capacitor) constituting the filter is changed. This change varies the DC input of the inverter apparatus, and consequently a fluctuation appears in the envelope of the inverter output voltage.

If the envelope of the inverter output voltage fluctuates, the load current of the inverter apparatus correspondingly varies and the DC input voltage of the inverter apparatus changes. Such a chain of a loop of the voltage/current changes causes a resonance phenomenon in the output voltage of the LC filter (DC input voltage of the inverter apparatus).

As described above, in the conventional power conversion apparatus for railcars, vehicles, etc., electric power is supplied to the inverter apparatus through the LC filter for eliminating a high-frequency component of the line voltage. Thus, if the periodic fluctuation in the input voltage due to a sudden load variation or a sudden line voltage change cannot completely corrected by a phase control circuit in the inverter apparatus, the output voltage oscillates periodically. As a result, a stable AC voltage cannot be supplied to an illumination device such as a fluorescent lamp, so that the illumination device may flicker.

The above-described resonance phenomenon can be prevented by the following methods:

(1) To increase the power capacity of the inverter apparatus thereby to reduce the influence due to the load variation;

(2) To increase the capacitance of the capacitor which constitutes the LC filter; or (3) To connect a limit resistor having a relatively high resistance value in series to the LC filter.

In order to perform method (1) or (2), the volume of the apparatus must be increased. The apparatus with such a large volume is not suitable for use in the electric railcar. In the case of method (3), since the amount of heat radiated from the limit resistor is large, the efficiency of the inverter apparatus lowers. Thus, bare method (3) is unsuitable.

SUMMARY OF THE INVENTION

The object of the present invention is to provide an apparatus capable of effectively damping a resonance Q due to a load variation or an abrupt line voltage change, without unnecessarily increasing the capacity of a power conversion apparatus, or without lowering the driving efficiency of the apparatus. In order to achieve the object of the present invention, a resonance damping circuit, which is formed of a series circuit comprising a reactor and a capacitor having a resonance frequency substantially equal to a frequency at which a resonance phenomenon occurs due to a change in load or line voltage, and a resistor, is connected in parallel to a reactor constituting an LC type DC filter circuit for eliminating a high-frequency component.

According to the power converting apparatus used for vehicles, railcars, etc., which has the DC filter circuit of the above structure, when a load or a line voltage suddenly changes, a current component of a frequency near the resonance frequency partly flows into the resonance damping circuit connected in parallel to the reactor of the DC filter circuit. Thus, when the DC filter circuit is considered as a whole, the gain at and near the resonance frequency of the DC filter circuit is reduced, so that the resonance Q is damped.

In addition, in the present invention, in order to achieve the above object, i.e., to damp the resonance Q of the DC filter without lowering the driving efficiency of the power converting apparatus, there is provided an electronic circuit for temporarily increasing the value of an equivalent DC resistance connected in series to the DC filter, only at a limited time period just after a large oscillation due to resonance occurs in an DC output of the DC filter. The resonance Q of the DC filter is damped by the increased equivalent DC resistance.

Although the increased equivalent DC resistance correspondingly increases power loss, the increase in resistance is caused only at a very short period just after the occurrence of resonance, and the power loss is not involved in a normal state in which resonance does not occur. Since a period at which resonance occurs is very short, compared to the period of normal driving, the resonance Q of the DC filter can be damped, substantially without lowering the driving efficiency of the power converting apparatus.

BRIEF DESCRIPTION OF THE DRAWINGS

FIG. 1 shows an inverter apparatus for a railcar, which comprises an LCR type resonance damping apparatus according to an embodiment of the present invention;

FIG. 2 is a Bode diagram for explaining a resonance damping effect of the resonance damping device shown in FIG. 1;

DETAILED DESCRIPTION OF THE PREFERRED EMBODIMENTS

Figure 3:
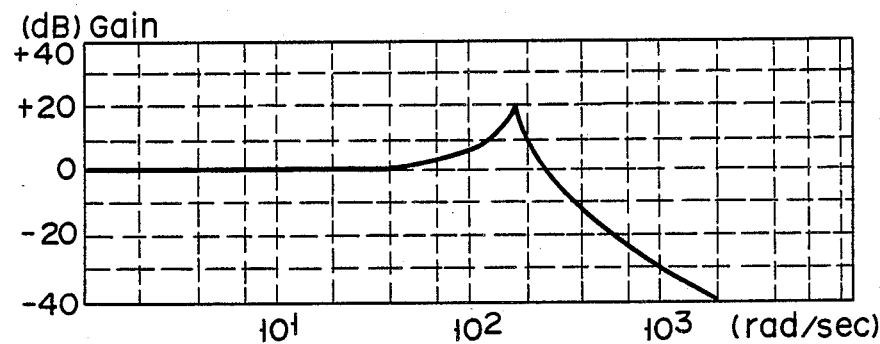
FIG. 3 is a Bode diagram showing a resonance peak of a conventional LC filter for an inverter, to which no resonance damping means is applied.

An embodiment of the present invention will now be described with reference to the accompanying drawings.

FIG. 1 shows a structure of a resonance damping apparatus of the present invention, in which an inverter is used as a power conversion apparatus. As shown in FIG. 1, one DC input terminal of a DC/AC inverter (or DC/DC converter) 5 is connected to a pantograph 1 through a limit resistor 2 and a reactor 3 which are connected in series. The other DC input terminal of the DC/AC inverter 5 is connected to a circuit ground. A capacitor 4 is connected between the two DC input terminals of the inverter 5 in parallel. The capacitor 4 and the reactor 3 constitute a DC low-pass filter (LPF) which eliminates a high-frequency component from a voltage supplied from a line 10. A three-phase AC output terminal of the inverter 5 is connected to a load 6 such as an electric motor or an illumination device. The load 6 is supplied with a three-phase AC power. In this case, in fact, there are an internal impedance of a transformer substation, an impedance of a line, and an internal resistance in the reactor 3 which exist in series to the reactor 3. However, these impedances and resistance are considered to be included in the limit resistor 2 and the reactor 3.

As shown in FIG. 1, a series LCR circuit (resonance damping circuit) of a reactor 7, a capacitor 8, and a resistor 9 has a resonance point substantially equal to the frequency at which a resonance phenomenon occurs due to variations in the load 6 and the line voltage. Such an LCR circuit is connected in parallel to the reactor 3 constituting the DC filter LPF. The LCR circuit serves as a band-pass filter BPF for selectively transmitting a resonance frequency.

In the inverter having the above structure, if the resonance frequency is set to be about 20 Hz, the circuit constants of LCR of the resonance damping circuit BPF are selected to $$1/(2\pi \sqrt{LC}) = 20 \quad (1)$$

The resistance R is set to a value higher than the impedance of the reactor 3 at the frequency of 20 Hz so that the peak of resonance is suppressed to +10 dB to +15 dB or less.

The resonance damping circuit BPF whose circuit constants are selected as described above is connected in parallel to the reactor 3. In this case, the frequency-gain characteristic of the output voltage V1 of the DC filter LPF is shown in FIG. 2. The impedance between terminals of the resonance damping circuit BPF is given by formula (2):

$$(j2\pi fL)+(1/j2\pi fC)+R \quad (2)$$

The impedance takes a minimum value R, when $f=f_0$. The resonance frequency $f_0$ is given by $$f_0 = 1/2\pi \sqrt{LC} \quad (3)$$

A current component having a frequency near the resonance frequency $f_0$ is branched and caused to flow to the resonance damping circuit BPF and then to the input side of the inverter 5. In this case, as compared to the gain indicated by a broken line in FIG. 2, the gain of the DC filter LPF lowers in the vicinity of the frequency $f_0$, and a fluctuation in an envelope of an inverter output caused by the resonance phenomenon is less-likely to occur.

As stated above, in this embodiment, in parallel to the reactor 3 of the DC filter LPF which is provided on the input-side of the inverter circuit 5, there is provided the resonance damping circuit BPF having a resonance point which is substantially equal to the frequency at which the resonance phenomenon occurs due to a variation of the load 6 or a sudden variation in line voltage. If the load 6 and the line voltage are kept in a normal state (i.e., with no resonance), the resonance damping circuit BPF has a high impedance with respect to the frequency component of the input voltage supplied in this state and is set in an electrically circuit-open state.

On the other hand, when the load changes or the line voltage abruptly changes, the resonance damping circuit exhibits a low impedance with respect to the resonance frequency component contained in the input voltage, and absorbs a current including the resonance frequency component. Thus, the resonance Q can be dampened without adversely affecting the other circuits. Regardless of the series-connection order of L, C, and R, the resonance Q can be similarly damped. Consequently, unlike in a conventional apparatus, a fluorescent lamp serving as the load 6 is not flickered by a periodic variation in the output voltage of the inverter 5. In addition, since the LCR circuit (resonance damping circuit BPF), in which no large current flows constantly, is simply connected to the reactor 3 of the DC filter LPF, the volume of the apparatus is not substantially increased, or the driving efficiency of the inverter 5 is not lowered. Thus, remarkable advantages in practical aspects can be obtained.

In the above embodiment, the inverter is used as a power conversion apparatus. However, the inverter can be replaced by a DC/DC converter, with the same advantages being obtained.

Figure 4:
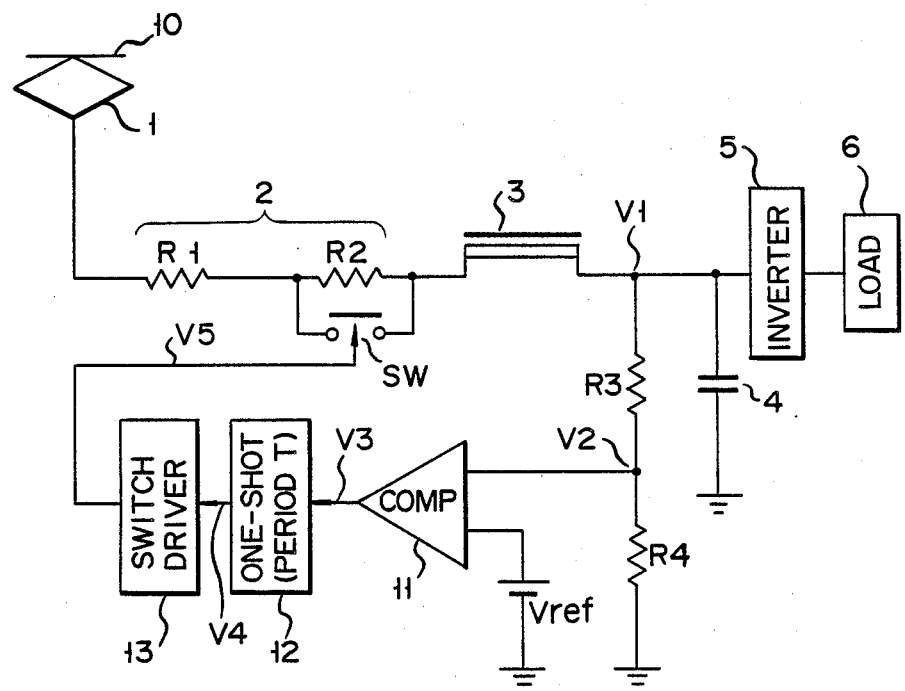
FIG. 4 is an inverter apparatus for a railcar having an electronic circuit type resonance damping apparatus according to a second embodiment of the present invention.

FIG. 4 shows an inverter apparatus for an electric railcar, which is provided with an electric circuit type resonance damping apparatus according to a second embodiment of the present invention. The structural elements shown in FIG. 1 are denoted by the same reference numerals.

Figure 5A:
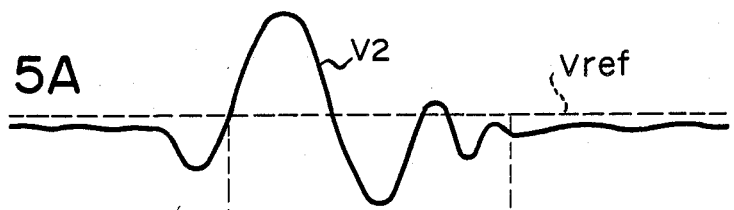
FIG. 5A shows a waveform of an example of oscillation of a filter output voltage, due to resonance of a DC filter shown in FIG. 4.

An output voltage (a DC input to inverter 5) V1 of a DC filter is lowered to a signal voltage V2 of about several Volts, by a voltage divider comprising resistors R3 and R4. The voltage V2 has a waveform similar to that of the output voltage V1 of the filter (FIG. 5A). When the voltage V1 is not affected by an oscillation due to resonance of the filter, the voltage V2 is less than a reference voltage Vref.

Figure 5B:
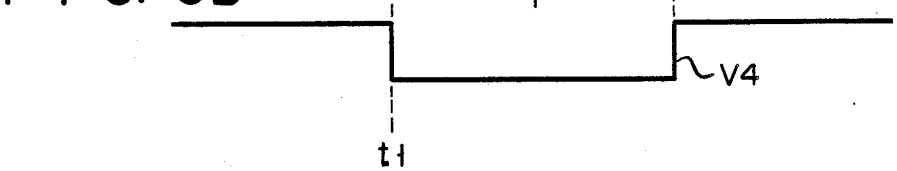
FIG. 5B shows a waveform for explaining the operation of an electronic circuit shown in FIG. 4, by which the voltage oscillation illustrated in FIG. 5A is detected.

When the voltage V1 is affected by an oscillation due to a filter resonance, the voltage V2 exceeds the value of the reference voltage Vref at time t1 just after the occurrence of the oscillation. Then, the comparator 11 generates a reference voltage V3. A one-shot 12 is triggered by the reference voltage V3 to supply a signal V4 (FIG. 5B) having a predetermined pulse width t to a switch driver 13. Receiving the signal V4, the switch driver 13 delivers a signal V5 to a switch SW for a period T.

The switch SW is a normally-ON type and is connected in parallel to a resistor R2 which is one of series-connected resistors R1 and R2. The resistor R1 serves to limit an overcurrent. The resistor R2 serves to sufficiently damp the resonance Q of the DC filter which cannot be completely damped by only the resistor R1. When the voltage V5 is supplied to the switch SW, the switch SW is turned off in the time period T. During the period T, the series resistance of the reactor 3 of the DC filter is increased from R1 to R1+R2, so that the resonance of the DC filter is sufficiently damped.

The resistance of the overcurrent limit resistor R1 is determined by the specifications (maximum current allowance) of the DC filter or inverter 5. After the resistance of the resistor R1 has been determined, the resistance of the resistor R2 is determined based on an experiment carried out for each actual apparatus, such that the peak value shown in FIG. 2 becomes equal to or lower than +10 dB to +15 dB. The period T is also determined, based on preliminary experiments or practical experiments of actual apparatuses, so that the period T is sufficient for resonance damping.

Figure 4A:
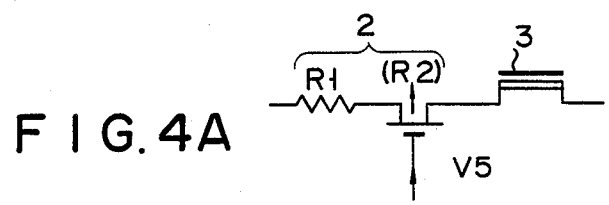
FIG. 4A shows a modification of a part of the circuit shown in FIG. 4.

As shown in FIG. 4A, the switch SW may be replaced with a semiconductor switching element such as a power MOS transistor. In this case, the internal resistance ("ON" resistance) of the transistor in the "ON" state may be utilized as the Q damping resistor R2. The internal resistance of the MOS transistor can be controlled by a gate voltage V5. Thus, the overcurrent limit resistor R1 can be omitted, and, instead, the "ON" resistance of this transistor can be controlled to be varied between "R1" and "R1+R2" by using the voltage V5.

Figure 6:
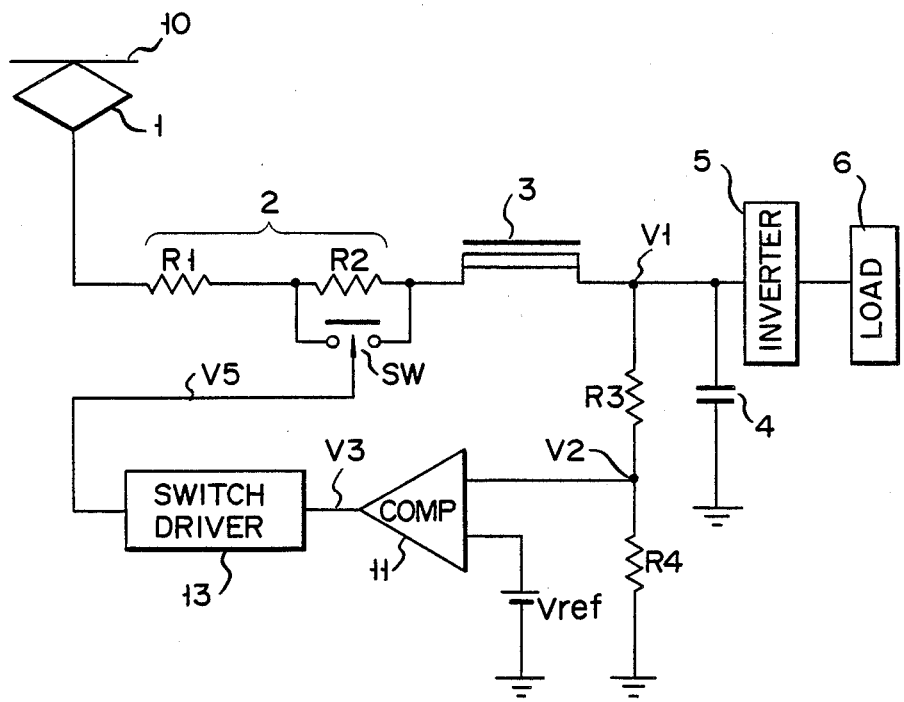
FIG. 6 shows an inverter apparatus for a railcar, which comprises an electronic circuit type resonance damping apparatus according to a third embodiment of the invention.
Figure 8:
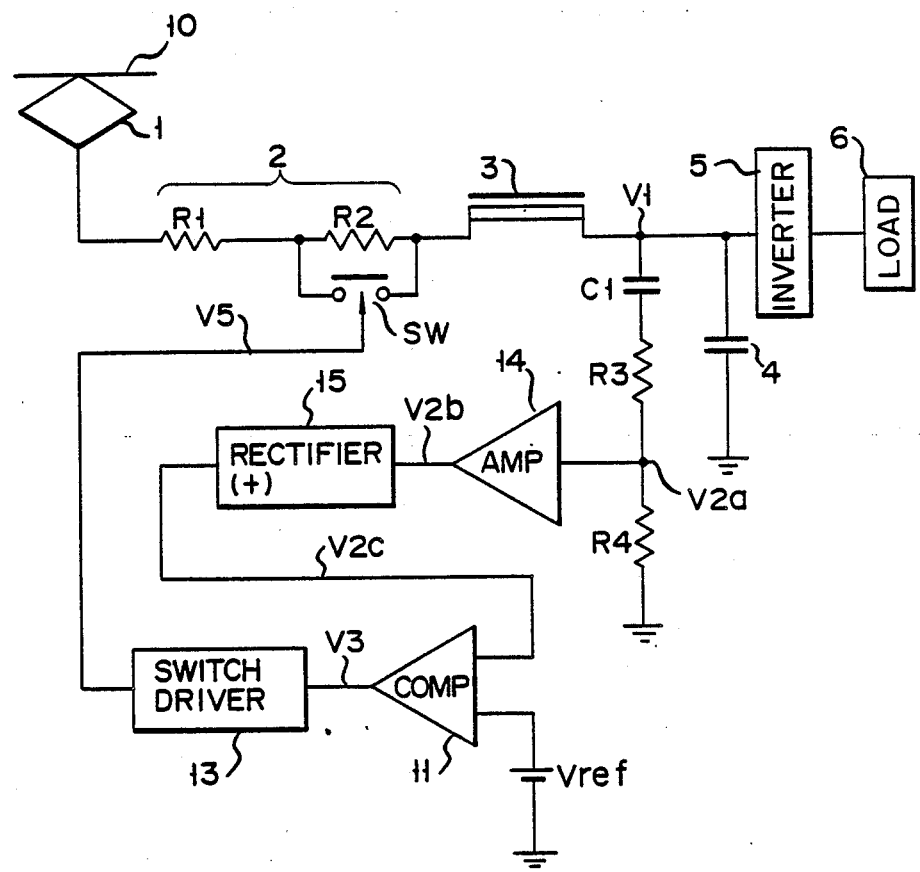
FIG. 8 shows an inverter apparatus for a railcar, which comprises an electronic circuit type resonance damping apparatus according to a fourth embodiment of the invention.

In addition, the BPF shown in FIG. 1 may be connected in parallel to the reactor 3 shown in FIG. 4, 6, or 8. The resistor 2 (R1, R2) may be inserted between the reactor 3 and the capacitor 4.

Incidentally, when DC voltage V1 largely varies, reference voltage Vref may be changed in proportion to the variation of voltage V1.

FIG. 6 shows an inverter apparatus used in an electric railcar, which is provided with an electric circuit type resonance damping apparatus according to a third embodiment of the present invention. In FIG. 6, the one-shot 12 shown in FIG. 4 is removed, and the switch driver 13 is directly driven by the output V3 from the comparator 11.

Figure 7A:
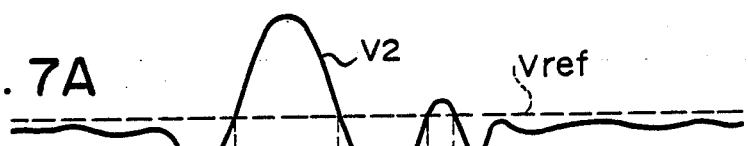
FIG. 7A shows a waveform of an example of a filter output voltage oscillation due to resonance of a DC filter shown in FIG. 6.
Figure 7B:
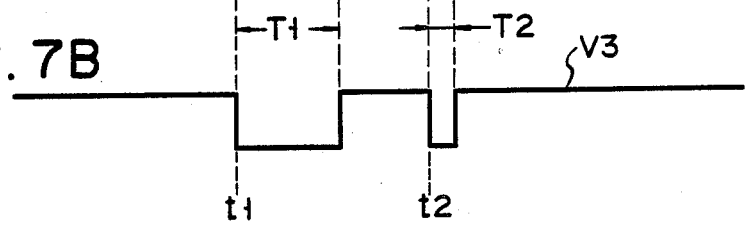
FIG. 7B shows a waveform for explaining the operation of an electronic circuit shown in FIG. 6, by which the voltage oscillation shown in FIG. 7A is detected.

In the structure shown in FIG. 6, each time the voltage V2 (FIG. 7A) exceeds the reference voltage Vref, the comparison output V3 is generated. Only while the comparison output V3 is being generated (T1, T2), the "normally-ON" switch SW is turned off, and the resonance is damped.

FIG. 8 shows an inverter apparatus used in an electric railcar, which is provided with an electronic circuit type resonance damping apparatus according to a fourth embodiment of the present invention. In the embodiments shown in FIGS. 4 and 6, an on/off timing of the switch SW is detected based on the voltage V2 including a DC component of the voltage V1. In contrast, in the embodiment in FIG. 8, the on/off timing of the switch SW is detected based on a voltage V2a including no DC components of the voltage V1.

In other words, the DC component of the voltage V1 is blocked by the capacitor C1, and only a variant component (AC component) is converted to the voltage V2a through the voltage divider comprising resistors R3 and R4. The voltage V2a is amplified by an AC amplifier 14, and the amplified signal V2b is converted to a DC signal V2c through a rectifier 15.

Thereafter, as in the case of FIG. 6, the signal V2c is compared with the reference voltage Vref, and a comparison result V3 is sent to the switch driver 13. The switch driver 13 receives the comparison result V3 and turns off the switch SW only during a period corresponding to the pulse width of the comparison result V3. Thus, the resonance of the DC filter is damped.

As has been described above, the apparatus according to the present invention can effectively damp the resonance phenomenon occurring due to a change in load or sudden variation of line voltage, without increasing the volume of a power conversion apparatus or without lowering the driving efficiency of the apparatus.

What is claimed is:

1. An apparatus for damping resonance of an LC type low-pass filter provided at the DC input side of a power converter having a DC input terminal, said apparatus comprising:

an electric circuit connected in parallel to a reactor constituting said LC type low-pass filter, said electric circuit having an impedance which takes a substantially minimum value at a frequency equal to a resonance frequency of the LC type low-pass filter.

2. The apparatus according to claim 1, wherein said electric circuit includes a series circuit formed by an inductor of inductance L, a capacitor of capacitance C, and a resistor of resistance R, wherein a value of the inductance L of the inductor and a value of the capacitance C of the capacitor are selected such that a resonance frequencies of the inductor and the capacitor are made to substantially coincide with the resonance frequency of a combination of the LC type low-pass filter and a load coupled to the low-pass filter, and a value of the resistance R of the resistor is selected such that a peak level of an output voltage of the LC type low-pass filter at said resonance frequency becomes equal to or lower than about +15 dB.

3. The apparatus according to claim 2, wherein the value of the resistance R of the resistor is selected such that the peak level of an output voltage of the LC type low-pass filter at said resonance frequency becomes equal to or lower than about +10 dB.

4. The apparatus according to claim 1, wherein said power converter includes an inverter for converting a DC power supplied from the LC type low-pass filter to an AC power.

5. The apparatus according to claim 1, wherein said power converter includes a converter for converting a DC power supplied from the LC type low-pass filter to an DC power.

6. An apparatus for damping resonance of an LC type low-pass filter provided on the DC input side of a power converter having a DC input terminal, said apparatus comprising:
   Q damping control signal generating means for comparing with a predetermined reference signal a first signal which varies in accordance with a change in an output voltage of said LC type low-pass filter, and generating a Q damping control signal when a level of the first signal exceeds a level of the reference signal; and
   resistor circuit means, connected in series to a reactor of the LC type low-pass filter, for increasing a DC resistance component of the reactor only for a period after said Q damping control signal has been generated.

7. The apparatus according to claim 6, wherein a value of an increased resistance component of said resistor circuit means is selected such that a peak level of an output voltage of said LC type low-pass filter at a resonance frequency of said LC type low-pass filter becomes equal to or less than about +15 dB.

8. The apparatus according to claim 6, wherein a value of an increased resistance component of said resistor circuit means is selected such that a peak level of an output voltage of said LC type low-pass filter at a resonance frequency of said LC type low-pass filter becomes equal to or less than about +10 dB.

9. The apparatus according to claim 6, wherein said Q damping control signal generating means includes:
   voltage dividing means for dividing the output voltage of the LC type low-pass filter to provide said first signal;
   comparing means for comparing the first signal with the predetermined reference voltage, and generating a second signal when a level of the first signal exceeds the level of the reference signal;
   pulse generating means for generating the Q damping control signal having a predetermined pulse width which substantially covers a voltage variation period during which the level of the first signal varies due to the resonance of the LC type low-pass filter after the second signal has been generated.

10. The apparatus according to claim 9, wherein said resistor circuit means includes:
    a variable resistor circuit connected in series to said reactor and formed of a first resistor component for limiting a maximum current flowing to said power converter and a second resistor component for damping resonance in the LC type low-pass filter; and
    means for setting, after the Q damping control signal has been generated, a value of the resistance of the variable resistor circuit to value of the second resistor component only in a period of the predetermined pulse width, and the value of the resistance of the variable resistor circuit to the value of the first resistor component in a period other than the period of the predetermined pulse width.

11. The apparatus according to claim 6, wherein said Q damping control signal generating means includes:
    means for dividing the output voltage of the LC type low-pass filter to provide said first signal;
    means for comparing the first signal with the predetermined reference voltage, and generating a second signal when a level of the first signal exceeds the level of the reference signal; and
    means for generating the Q damping control signal while the level of the first signal exceeds the level of the reference signal, just after the second signal has been generated.

12. The apparatus according to claim 11, wherein said resistor circuit means includes:
    a variable resistor circuit connected in series to said reactor and formed of a first resistor component for limiting a maximum current flowing to said power converter and a second resistor component for damping resonance in the LC type low-pass filter; and
    means for setting value a of the resistance of the variable resistor circuit to a value of the second resistor component only in a period during which the Q damping control signal is being generated, and setting the value of the resistance of the variable resistor circuit to a value of the first resistor component in a period other than said period during which the Q damping control signal is being generated.

13. The apparatus according to claim 6, wherein said Q damping control signal generating means includes:
    means for detecting a variation in the output voltage of the LC type low-pass filter as the first signal; and
    means for comparing a comparison input signal corresponding to an amplitude of said first signal with a predetermined reference signal, and generating the Q damping control signal when a level of the comparison input signal exceeds a level of the reference signal.

14. The apparatus according to claim 13, wherein said resistor circuit means includes:
    a variable resistor circuit connected in series to said reactor and formed of a first resistor component for limiting a maximum current flowing to said power converter and a second resistor component for damping resonance in the LC type low-pass filter; and
    means for setting a value of the resistance of the variable resistor circuit to a value of the second resistor component only in a period during which the Q damping control signal is being generated, and setting the value of the resistance of the variable resistor circuit to a value of the first resistor component in a period other than said period during which the Q damping control signal is being generated.

15. The apparatus according to claim 6, wherein said power converter includes an inverter for converting a DC power taken out of said LC type low-pass filter to an AC power.

16. The apparatus according to claim 6, wherein said power converter includes a converter for converting a DC power taken out of said LC type low-pass filter to a DC power.

* * * * *